United States Patent
Sinanoglu (10) Patent No.: US 9,262,292 B2
(45) Date of Patent: Feb. 16, 2016

(54) TEST ACCESS SYSTEM, METHOD AND COMPUTER-ACCESSIBLE MEDIUM FOR CHIPS WITH SPARE IDENTICAL CORES

(71) Applicant: New York University, New York, NY (US)

(72) Inventor: Ozgur Sinanoglu, Abu Dhabi (UA)

(73) Assignee: New York University, New York, NY (US)

( * ) Notice: Subject to any disclaimer, the term of this patent is extended or adjusted under 35 U.S.C. 154(b) by 224 days.

(21) Appl. No.: 13/912,493

(22) Filed: Jun. 7, 2013

(65) Prior Publication Data

US 2013/0332774 A1    Dec. 12, 2013

Related U.S. Application Data

(60) Provisional application No. 61/658,188, filed on Jun. 11, 2012.

(51) Int. Cl.

| | |
|---|---|
| *G06F 11/00* | (2006.01) |
| *G06F 11/263* | (2006.01) |
| *G06F 11/22* | (2006.01) |
| *G06F 11/267* | (2006.01) |
| *G06F 11/16* | (2006.01) |

(52) U.S. Cl.
CPC .......... *G06F 11/263* (2013.01); *G06F 11/2242* (2013.01); *G06F 11/267* (2013.01); *G06F 11/1641* (2013.01)

(58) Field of Classification Search
CPC ............... G01R 31/318536; G01R 31/318544; G01R 31/318572; G06F 11/2236; G06F 11/2242; G06F 11/273; G06F 11/277
See application file for complete search history.

(56) References Cited

U.S. PATENT DOCUMENTS

| | | | | |
|---|---|---|---|---|
| 5,132,635 A | * | 7/1992 | Kennedy | G01R 31/318558 324/73.1 |
| 5,195,097 A | * | 3/1993 | Bogholtz, Jr. | G01R 31/31919 714/724 |
| 6,675,284 B1 | * | 1/2004 | Warren | G06F 11/267 709/250 |
| 7,139,947 B2 | * | 11/2006 | Miner | G06F 11/267 714/30 |
| 7,356,745 B2 | * | 4/2008 | Whetsel | G01R 31/3177 714/726 |
| 7,523,297 B1 | * | 4/2009 | Mistely | G06F 9/30003 700/26 |
| 7,685,487 B1 | * | 3/2010 | Kuo | G01R 31/318563 714/726 |
| 8,977,895 B2 | * | 3/2015 | Anandavally et al. | 714/11 |
| 9,032,256 B2 | * | 5/2015 | Douskey | G06F 11/2242 714/11 |

(Continued)

OTHER PUBLICATIONS

Giles, "Test Access Mechanism for Multiple Identical Cores" 2009, IEEE, AMD, p. 1-10.*

(Continued)

*Primary Examiner* — Bryce Bonzo
*Assistant Examiner* — Jeison C Arcos
(74) *Attorney, Agent, or Firm* — Andrews Kurth LLP (57) ABSTRACT

Exemplary system, method and computer-accessible medium for testing a multi-core chip can be provided which can have and/or utilize a plurality of identical cores. This can be performed by comparing each core with as many as at least the number of spare cores plus 1 using a comparator; the number of comparators can equal the total number of cores multiplied by one-half the number of spare cores plus 1. A mismatch between two cores can identify at least one of the two cores as defective and a perfect match between two cores can identify both cores as not defective. The multi-core chip can fail the test if the number of defective cores can be greater than the number of spare cores.

25 Claims, 4 Drawing Sheets

(56) References Cited

U.S. PATENT DOCUMENTS

| | | | | |
|---|---|---|---|---|
| 2005/0005217 | A1* | 1/2005 | Whetsel | G01R 31/318508 714/727 |
| 2005/0240850 | A1* | 10/2005 | Ohwada | G01R 31/318547 714/738 |
| 2006/0230308 | A1* | 10/2006 | Barlow et al. | 714/11 |
| 2007/0011535 | A1* | 1/2007 | Anzou | G11C 29/40 714/733 |
| 2008/0148117 | A1* | 6/2008 | Seuring | G01R 31/318563 714/726 |
| 2008/0163255 | A1* | 7/2008 | Munoz et al. | 719/318 |
| 2009/0089636 | A1* | 4/2009 | Fernsler | G06F 11/2242 714/728 |
| 2009/0193303 | A1* | 7/2009 | Giles | G01R 31/318536 714/726 |
| 2009/0292897 | A1* | 11/2009 | Koinuma | 711/173 |
| 2010/0192012 | A1* | 7/2010 | Parulkar | 714/24 |
| 2011/0078525 | A1* | 3/2011 | Xia et al. | 714/731 |
| 2014/0164837 | A1* | 6/2014 | Yang | G06F 11/277 714/37 |

OTHER PUBLICATIONS

I. Parulkar, et al. "A scalable, low cost design-for-test architecture for ultrasparc trade; chip multi-processors," in ITC, 2002.

D. Geer, "Chip makers turn to multicore processors," Computer, vol. 38, No. 5, pp. 11-13, May 2005.

L. Bushard, et al., "Dft of the cell processor and its impact on eda test software," in ATS, 2006, pp. 369-374.

S. Makar et al., "Testing of vega2, a chip multi-processor with spare processors.," in ITC, 2007, pp. 1-10.

Lei Zhang, et al., "Defect tolerance in homogeneous manycore processors using core-level redundancy with unified topology," in Date, 2008, pp. 891-896.

P. J. Tan, Tung Le, Keng-Hian Ng, Prasad Mantri, and James Westfall, "Testing of ultrasparc t1 microprocessor and its challenges," in ITC, 2006, pp. 1-10.

D. Iverson, et al, "Redundant core testing on the cell be microprocessor," in ITC, 2010, pp. 1-6.

S. Shamshiri, et al, "A cost analysis framework for multi-core systems with spares," in ITC, 2008, pp. 1-8.

Lin Huang and Qiang Xu, "Economic analysis of testing homogeneous manycore chips," TCAD, vol. 29, No. 8, pp. 1257-1270, 2010.

T. Wood, "Position statement: Have we overcome the challenges associated with soc and multi-core testing?," in ITC, 2005, p. Panel 6.3.

"IEEE standard testability method for embedded core-based integrated circuits," IEEE Std 1500-2005, 2005.

E.J. Marinissen and Y. Zorian, "IEEE std 1500 enables modular soc testing," IEEE D&T, vol. 26, No. 1, pp. 8-17, 2009.

R. Molyneaux, et al, "Design for testability features of the sun microsystems niagara2 cmp/cmt sparc chip," in ITC, 2007, pp. 1-8.

Yuejian Wu and P. MacDonald, "Testing asics with multiple identical cores," TCAD, vol. 22, No. 3, pp. 327-336, Mar. 2003.

A.D. Singh, "Scan based testing of dual/multi core processors for small delay defects," in ITC, 2008, pp. 1-8.

G. Giles, et al, "Test access mechanism for multiple identical cores," in ITC, 2009, pp. 1-10.

K.J. Balakrishnan, et al, "Test access mechanism in the quad-core amd opteron microprocessor," IEEE D&T, vol. 26, No. 1, pp. 52-59, 2009.

Zichu Qi, et al, "A scalable scan architecture for godson-3 multicore microprocessor," in ATS, 2009, pp. 219-224.

Chun-Chuan Chi, et al, "A low-cost and scalable test architecture for multi-core chips," in ETS, May 2010, pp. 30-35.

M. Majeed, et al, "Efficient embedding of deterministic test data," in ATS, 2010, pp. 159-162.

Yanjing Li, et al: Concurrent autonomous chip self-test using stored test patterns, in Date, 2008, pp. 885-890.

M. Sharma et al, "A novel test access mechanism for failure diagnosis of multiple isolated identical cores," in ITC, 2011, pp. 1-8.

Riley, et al., "Testability features of the first-generation cell processor," in ITC, 2005, pp. 9 pp. 119.

P. Girard, "Survey of low-power testing of VLSI circuits," IEEE Design and Test, vol. 19, No. 3, pp. 82-92, 2002.

O. Sinanoglu and A. Orailoglu, "Test power reductions . . . efficient, decoupled scan chain modifications," Reliability, IEEE Transactions on, vol. 54, No. 2, pp. 215-223, 2005.

http://www.isaakian.com/vhdl/aes/.

* cited by examiner

Figure 7

TEST ACCESS SYSTEM, METHOD AND COMPUTER-ACCESSIBLE MEDIUM FOR CHIPS WITH SPARE IDENTICAL CORES

CROSS-REFERENCE TO RELATED APPLICATIONS

This application relates to and claims priority from U.S. Patent Application No. 61/658,188 filed on Jun. 11, 2012, the entire disclosure of which is incorporated herein by reference.

FIELD OF THE DISCLOSURE

The present disclosure relates generally to exemplary embodiments of systems, methods, and computer-accessible-mediums for testing multiple identical cores, and more specifically, to exemplary embodiments of systems, methods, and computer-accessible mediums for testing chips having identical cores by performing comparisons based on the total number of spare cores.

BACKGROUND INFORMATION

Scalability, power-efficiency and shorter time-to-market due to design re-use has paved the way for multi-core or many-core chips, wherein identical processing units (e.g., cores) are integrated together to offer enhanced computational power. (See, e.g., Reference 1). Chips with identical cores generally help cope with increasing defect rates in delivering reasonable yield levels via the utilization of spare cores. (See, e.g., References 2, 3, 4, 5, 6). With defective cores masked off, the remaining defect-free cores can still perform in compliance with the specifications of the chip. Binning of chips based on the number of defect-free cores has also been proposed. (See, e.g., References 2 and 5). The spare core approach can be advocated for not only enhancing yield, but also for alleviating test requirements, thus reducing test costs. (See, e.g., References 7 and 8).

The fact that the cores can be identical can be exploited to lower test costs. (See, e.g., Reference 9). In general, core-based or modular testing can benefit from the fact that a proper isolation mechanism can be in place. (See, e.g., References 10 and 11). With identical cores, the application of identical test patterns to each identical core can utilize a proper isolation mechanism that can deliver direct controllability/observability of core I/Os. Conventional Test Access Mechanisms ("TAMs") (see, e.g., References 10 and 11) originally proposed to support heterogeneous cores, can be simplified to lower design and test costs in the presence of identical cores. Bandwidth and area consuming test busses can be replaced by simpler mechanisms, alleviating bandwidth and area costs. On the input side, this simplification can take the form of broadcasting the same test stimuli to the identical cores, lowering the input bandwidth requirements. Collection of responses from the identical cores must be carefully engineered, however, in order to cope with the unorthodox test challenges stemming from the presence of spare cores on-chip, which can invalidate the conventional single fault assumption. Failure to account for the spare cores in the TAM design can result in yield loss, offsetting the yield enhancement benefit of the spare core approach.

Direct extensions of conventional TAMs (see e.g., References 5, 6, 12 and 13) have been employed for chips with identical cores, failing to exploit core identicalness in attaining test cost reductions. These techniques can allocate dedicated scan-in and scan-out bandwidth to each core, and while the cores can be identical, the test is conducted as if the cores are non-identical. As previously known (see, e.g., Reference 3), the need to observe each identical core can be alleviated by loading the expected core responses from dedicated input channels, and comparing all the core responses with the expected responses in parallel. This approach can attain parallelism in identical core tests. However, bandwidth requirements for the outputs, although alleviated, can turn into additional input bandwidth requirements.

Comparison-based TAMs (see, e.g., References 14-16) have been proposed to eliminate the need for any bandwidth to be allocated for the responses of identical cores. The output responses of identical cores, stimulated by identical test patterns, can be compared on-chip, pair-wise, and any mismatch can be recorded in error bits. As previously known, a lock-step mode facilitates the broadcasting of the same patterns to two cores, and an on-chip comparator that can be continuously observed that can reveal any mismatch between identical cores. (See, e.g., Reference 14) Another approach can employ a test mode that enables similar comparisons, but also offers the option of observing an accumulated error signature rather than continuous observation of the comparator output. (See, e.g., Reference 15). A further approach can follow a similar approach by taking one core as a timing reference in testing the other identical core. (See, e.g., Reference 16). These comparison-based TAMs can incur yield loss for chips with spare cores as a good core compared with only defective core(s) can be deemed defective, albeit incorrectly.

Another approach that has recently been proposed can be a pipelined comparison-based TAM. (See, e.g., References 17 and 18). This TAM can support a self-compare mode, where the response of each core can be compared against the expected responses loaded from dedicated scan-inputs, or against the response of one core that can be taken as reference, which can be the inter-core compare mode. The bandwidth requirements of the former mode can be the same as previously described (see, e.g., Reference 3), while the latter mode can incur the same bandwidth requirement but for outputs rather than inputs. Furthermore, if the reference core can be identified to be defective in the latter mode, the test session can be repeated as the previous comparisons can all be invalidated. Further, the pipelining mechanism and the command control of these procedures can incur the allocation of four channels for control purposes, which can be shown to reflect into a 12% test time penalty. To alleviate the pipelining complications, previous approaches can make use of balancing registers at the inputs and outputs of each core, enabling simultaneous comparisons of core responses. However, multiple test sessions can be used. (See, e.g., Reference 19).

Comparison-based TAMs can perform poorly as a good core can be compared with only bad cores, even if these cores are known-bad cores. The mismatches obtained through all the comparisons can result in an ambiguous conclusion regarding the good core, as the end-result (e.g., always mismatches) could have been the same even if this good core can be defective.

Figure 1:
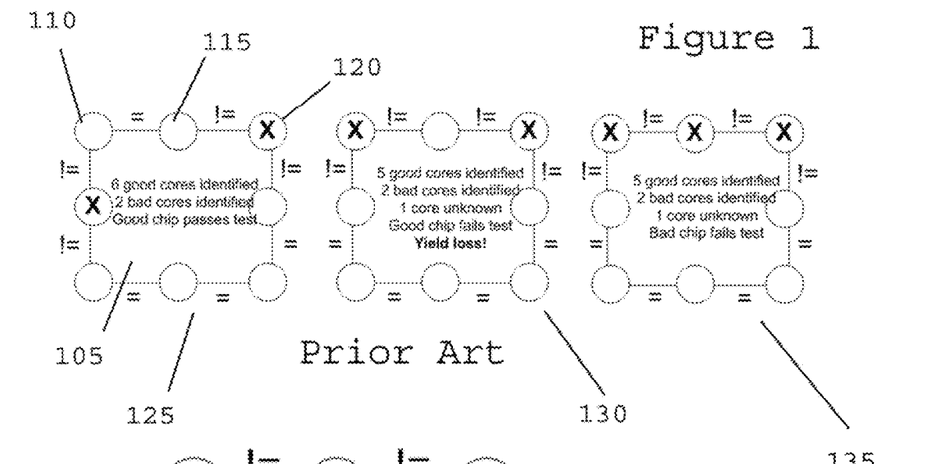
FIG. 1 is an exemplary diagram of an exemplary yield loss with a conventional comparator Test Access Mechanism having two spare cores in eight cores.

FIG. 1 illustrates three exemplary scenarios, each for a chip with eight cores, two of which are spare cores. Six good cores out of eight cores can be considered as the passing criterion, and the test can be conducted by comparing each core with its two neighbors. As shown in FIG. 1, a node 105 can have a core 115 and an edge 110 can denote a comparison. The accumulated comparison signatures obtained throughout the test can be analyzed to judge whether the chip can be usable. A single bit signature collected for each comparison can indicate whether the response of two cores can perfectly match throughout the entire test. The actual defective cores 120 can be marked with an "X" inside the corresponding nodes.

In the first case 125, for example, four out of eight comparisons can indicate a perfect match between cores. The cores involved in these exemplary comparisons can thus be identified to be all "good", pointing to the actual six good cores. The mismatches between the known-good cores and the remaining two cores can help conclude that these two cores are defective, non-ambiguously identifying all the good and the bad cores, and deeming the chip usable.

In the second case 130, for example, the four perfect matches can help exonerate five of the six good cores. These can be the three cores in the bottom row, and the two in the middle row. For example, the mismatches between the known-good cores and the cores in the top two corners can indicate that these two cores are both defective. The core between the top two corners, however, may not be identified as good or bad. The only information regarding this core can be the mismatches when compared to the two bad cores. As no other good core can witness for this core, one cannot tell whether it can be a good core or a bad core. Even though the chip can have six good cores, the comparison-based test can identify five good ones, failing to pass this usable chip, and resulting in yield loss.

The third case 135, can likely be the same as the second case, except that the core in between the top two corners can be defective. Again, all good cores are identified through four matches, and the cores on the top two corners can also be identified as defective through mismatches with the known-good cores. The core in between the top two corners can be questionable, again, as it can be compared with bad cores only. This chip fails the test, this time correctly.

The problem with the comparison-based TAMs can be the ambiguity regarding the cores that are compared with only bad cores, which can result in yield loss in the second case 130. Another way to understand this ambiguity can be by comparing the match-mismatch signatures of the last two cases. Both cases can result in the exact same eight-bit match/mismatch signatures, while the core in between the top two corners can be good in the second case 130, and defective in the third 135.

Other approaches can include (a) a two-dimensional pipelining approach that can utilize the first slice of each core as the pipelining registers (see, e.g., Reference 20), (b) application of the same test data repeatedly to identical cores through an embedded controller to reduce the test data volume but not the test time (see, e.g., Reference 21), (c) an on-line testing procedure that reaps test data storage and on-chip hardware support benefits due to identical cores (see, e.g., Reference 22), and (d) a failure diagnostics approach. (See, e.g., Reference 23). These exemplary TAMs can typically support a diagnostic mode where the fail data can be unloaded from the chip. The support can be in the form of either observing the responses of one particular core or of all cores. The latter approach can be inefficient in terms of diagnostic time, as known-good cores need not be observed. The former approach has to conduct a test session first to determine the failing core(s), which are then observed individually.

Thus, it may be beneficial to provide an exemplary system, method and computer-accessible medium that can that can reduce test bandwidth and test time, while preventing yield loss in the presence of spare cores, and which can overcome at least some of the deficiencies indicated herein above.

SUMMARY OF EXEMPLARY EMBODIMENTS

Thus, it may be beneficial to incorporate a test access mechanism that utilizes less bandwidth and time, while limiting yield loss in the presence of spare identical cores.

According to an exemplary embodiment of the present disclosure, system, method and computer-accessible medium can be provided for a comparison-based TAM that can handle spare identical cores. The TAM can guarantee, for example, the test of a chip through minimum bandwidth with minimum test time, while ensuring no yield loss in the presence of spare identical cores, as its design can be driven by the number of spare cores on the chip. In the exemplary system, method and computer-accessible medium, a sufficient number of comparisons can ensure the exoneration of all defect-free cores in the presence of at least as many spare cores as defective cores, deeming the chip usable, and thus preventing yield loss. The exemplary system, method and computer-accessible medium can be inserted on the test paths, and thus can have little or no impact on the functional performance.

The exemplary system, method and computer-accessible medium can be based on a simple binary model, namely, "(number of bad cores≤number of spare cores)→pass", but can also support other models where a chip can be priced based on the number of good cores on the chip. As long as a sufficient number of comparisons are conducted, the pass-fail signature that the exemplary system, method and computer-accessible medium can deliver, can be sufficient to exactly pinpoint all the good cores on the chip, which can enable proper pricing.

Additionally, according to an exemplary embodiment of the present disclosure, a diagnostic feature can be added to the exemplary system, method and computer-accessible medium in order to enable the collection of fail data judiciously. Efficient usage of output bandwidth can enable diagnostic time minimization.

These and other objects of the present disclosure can be achieved by systems, methods and computer-accessible mediums for testing a multi-core chip having a plurality of identical cores, which can include, for example, comparing each of the cores from a multi-core chip with a first number of cores which can correspond to a second number of spare cores plus 1. The one(s) of the at least two cores can be indicated as defective when there can be a mismatch between at least two of the cores. For example, at least two of the cores can be identified as not defective when there can be a perfect match between the at least two of the cores.

In certain exemplary embodiments of the present disclosure, the multi-core chip can fail if a third number of defective ones of the cores is greater than a second number of the spare cores. Each of the cores can be compared using a comparator(s), and a fourth number of the comparators can be equal to a total number of the cores multiplied by one-half the number of the spare cores plus 1. The comparison of each of the cores can be recorded using sticky mismatch bits. In certain exemplary embodiments of the present disclosure, a signature bit can be set at 0 when one(s) of the cores fails the comparison. According to some exemplary embodiments of the present disclosure, the multi-core chip can be compared using a diagnostic support, which can lock an output channel of a first one of the cores to fail the comparison.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Throughout the drawings, the same reference numerals and characters, unless otherwise stated, are used to denote like features, elements, components, or portions of the illustrated embodiments. Moreover, while the present disclosure will now be described in detail with reference to the Figures, it is done so in connection with the illustrative embodiments and is not limited by the particular embodiments illustrated in the Figures.

DETAILED DESCRIPTION OF EXEMPLARY EMBODIMENTS

According to an exemplary embodiment of the present disclosure, system, method and computer-accessible medium can be provided to facilitate a reduction in the bandwidth and test time for a TAM for chips with identical cores.

Exemplary TAM

Figure 2:
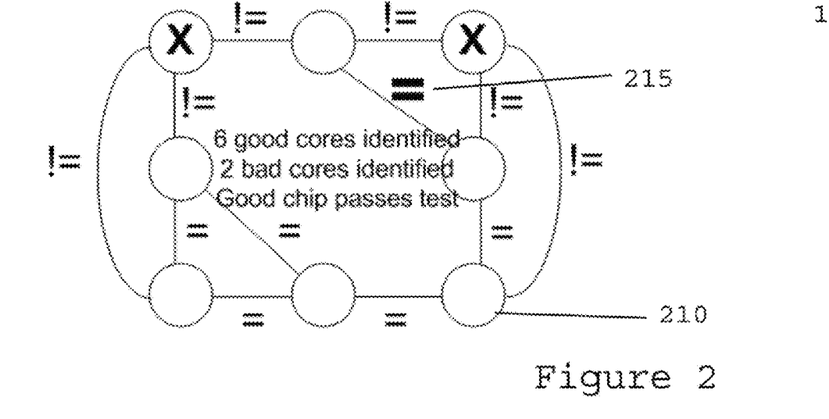
FIG. 2 is an exemplary diagram of the exemplary yield loss recovery according to an exemplary embodiment of the present disclosure.

The exemplary system, method and computer-accessible medium for TAM, according to an exemplary embodiment of the present disclosure, can reduce and/or eliminate ambiguity found in prior art methods via a sufficient number of on-chip comparisons, where the number of comparisons can be dictated by the number of spare cores. In the case of, for example, two spare cores, every core can be compared with three other cores as illustrated in FIG. 2, where the number of comparisons can be twelve instead of eight. The matches can pinpoint, e.g., all six good cores 210; the particular match that exonerates the core in between the top two corners (e.g., ambiguous core shown in FIG. 1) is indicated in FIG. 2 with an equal sign having a larger font size 215. As little or no ambiguity remains upon the analysis of comparison signatures, the chip can be deemed usable, recovering the yield loss of the spare-unaware comparison-based TAMs.

To generalize, for example, for a chip with k spare cores (e.g., passing criterion for the chip can be N−k good cores out of N), the exemplary system, method and computer-accessible medium for TAM, according to an exemplary embodiment of the present disclosure, can compare every core with every other k+1 cores. A good core can be guaranteed or provided to be compared against another good core when compared against k+1 cores in the presence of at most k defective cores, exonerating this good core. The ambiguity due to comparison against most or all-bad cores (e.g., yield loss of a usable chip) can thus be reduced and/or eliminated. This ambiguity can still exist, however, when the chip can have more than k defective cores. In such a case, the chip may not be usable and thus should fail the test, which it would have otherwise. Otherwise, for at least N−k good cores, the pass-fail information delivered by the exemplary system, method, and computer-accessible medium TAM can reveal all the good cores and the bad cores, also enabling the proper pricing of the chip, if the price model can be dictated by the number of good cores.

The exemplary system, method and computer-accessible medium for TAM, according to an exemplary embodiment of the present disclosure, can utilize N (k+1)/2 comparators in total, resulting in (k+1)/2 comparators per core. Sticky mismatch bits can be utilized to record the on-chip comparisons in a manner similar to previously proposed techniques. (See, e.g., Reference 15). When a comparison fails in a cycle, the one-bit signature can stick to a '0'. In the exemplary illustrations, a single-bit signature representing the comparison of two cores can be assumed. A further alternative exemplary implementation with more enhanced comparison resolution, and inevitably higher area cost, can be where a single-bit signature can represent the comparison of two chains, for example, one from each of the two cores being compared, resulting in as many signature bits as the number of chains in a core. In the former implementation, N(k+1)/2 bits can be shifted out and analyzed at the end of the entire test session in order to issue a pass or fail for the chip, and to mask the bad cores in the usable chips.

Figure 3:
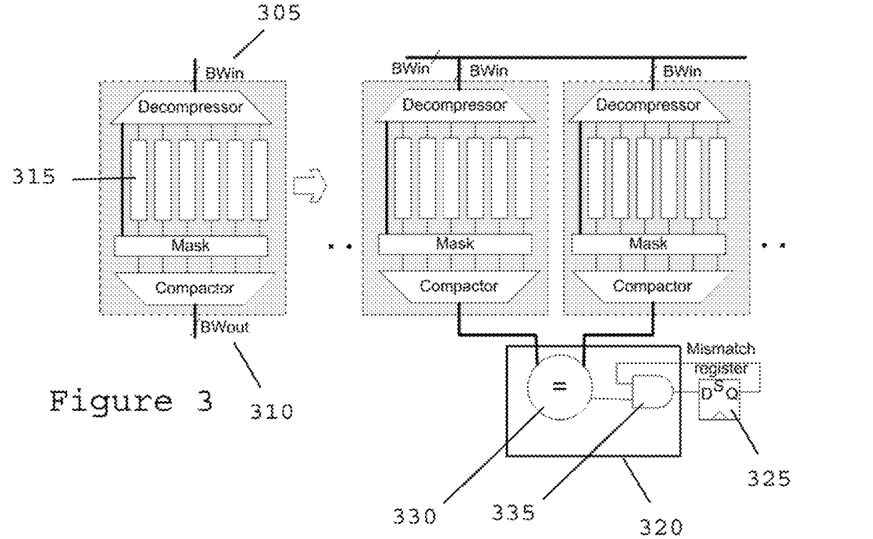
FIG. 3 is an exemplary diagram of an exemplary fragment of a comparison-based Test Access Mechanism provided between two cores according to an exemplary embodiment of the present disclosure.

FIG. 3 illustrates a diagram of a fragment of comparison-based TAM in between two cores in accordance with an exemplary embodiment of the present disclosure. Although FIG. 3 illustrates an example of cores with compression support, cores with no compression can also be supported. According to FIG. 3, BW_in 305 and BW_out 310 can denote the bandwidth 315 (e.g., number of channels) dedicated for input and output of the cores. FIG. 3 shows that the comparison-based TAM can reduce and/or eliminate the need for any output bandwidth. FIG. 3 also illustrates the sticky mismatch mechanism 320; the signature bit, initialized to a '1' at the beginning of test, sticks to a '0' upon a mismatch between the responses of the two cores in any cycle. The signature bit can be accumulated in the D flip-flop 325. The accumulation for signature computation can be performed while the core responses are being shifted out. The mismatch mechanism 320 can include the comparator 330, the AND gate 335 and the D flip-flop 325. The 1-bit content of the D flip-flop 325 can be the resulting signature bit. The total test time for the entire chip can equal the time it takes to test a single core. Furthermore, the bandwidth requirement to test the entire chip can be further alleviated (e.g., a total of BW_in channels) compared to testing a single core (e.g., a total of BW_in +BW_out channels). The exemplary system, method and computer-accessible medium for TAM, according to an exemplary embodiment of the present disclosure, can reduce the test bandwidth and test time while preventing yield loss in the presence of spare cores.

Exemplary Diagnostic Support

While the exemplary embodiments of the system, method and computer-accessible medium for TAM, according to an exemplary embodiment of the present disclosure, can optimize bandwidth requirements and test time, proving cost-effective in high volume production during mature phases of manufacturing process, the only fail information collected during test can be the match/mismatch signatures, leading to the knowledge of good and bad cores only, and to poor diagnostic resolution. Thus, for example, a diagnostic feature can be added to the exemplary system, method and computer-accessible medium for TAM in order to enable the collection of fail data judiciously. Ideally, for example, any bandwidth allocated for fail data collection can be utilized as efficiently as possible. The exemplary diagnostic mechanism can facilitate the observation of the first failing core by immediately locking the output channels to this core, from the time of the first mismatch until the end of the entire test session. This way, if a chip can have a defective core, no test session can be wasted by observing the responses of a good core. By the end of the test session (e.g., same duration to test a single core), the responses of one defective core can be collected.

Figure 4:
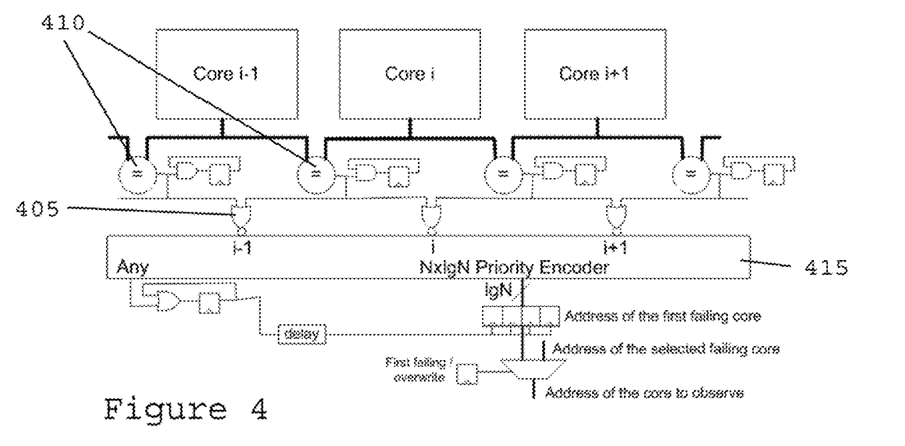
FIG. 4 is an exemplary schematic diagram of an exemplary diagnostic mechanism according to an exemplary embodiment of the present disclosure.

FIG. 4 shows a schematic diagram of a part of a diagnostic hardware that can facilitate the observation of the first failing core according to an exemplary embodiment of the present disclosure. In this exemplary case, which can be designed for a single spare core (e.g., a comparison against two other cores), the first failing core can be the one that creates a mismatch with both of its neighbors. For example, the NOR gate 405, that can constantly monitors both comparators 410 for a given core, can indicate a mismatch with both neighbors by providing a '1' to the priority encoder. It should be noted that if multiple cores fail during the same cycle for the first time, the priority mechanism built-in to the encoder 415 can select one of the defective cores to be observed. Even if neighboring cores fail during the same cycle (e.g., first cycle of failure), the comparator 410 for these two cores can indicate a mismatch, enabling the observation of one of these cores depending on the priority mechanism of the encoder 415.

Until the first fail cycle, the "Any" output of the encoder 415 can remain at '0', as no mismatch can be reported yet. During the first fail cycle, "Any" becomes '1', which can create a rising transition for the first and the last time (e.g., sticky mechanism), which can be used as a clock signal to store the address of the first failing core at the output of the priority encoder. This can be accomplished by delaying the clock signal slightly. The address of the core can be utilized in selecting the outputs of this particular core, and connecting it to the output channels of the chip. The output bus selection mechanism can be implemented through a MUX-based or a bypass-supported daisy-chained mechanism 420 (See, e.g., Reference 10). The address of the observed core can also be shifted out at the end of the test session.

It can suffice to fully observe one failing core for diagnostics and yield an improvement. In this exemplary case, the exemplary diagnostic mechanism can facilitate the collection of fail data with identical bandwidth requirements (e.g., a total of BW_in +BW_out channels) and test time to test a single core. However, for further fail data collection, and to observe other failing cores as well, the exemplary diagnostic mechanism can also support the observation of a selected core. A single bit ("first failing/overwrite") configured at the beginning of the test session can facilitate the observation of the first failing core or a pre-specified (e.g., known-defective) core, whose address can be loaded at the beginning of the test session. In this exemplary manner, the following diagnostic strategy can be pursued; (1) the very first test session can connect the output channels to the first-failing core in addition to identifying the mismatches and thus the other defective cores, and (2) each of the subsequent sessions observes one of the remaining (e.g., identified and selected) defective cores at a time. Such a strategy can be optimal in terms of diagnostic time (e.g., equals the product of the number of defective cores and the time it takes to test a single core) and bandwidth requirements (e.g., a total of BW_in+BW_out channels), as the output bandwidth can be utilized to observe only the defective cores, and none of the good cores.

Exemplary Trade-Off Between Area Cost and Yield Loss

The associated area cost for the exemplary system, method and computer-accessible medium for TAM, according to an exemplary embodiment of the present disclosure, can be, e.g., mostly dominated by the on-chip comparators. For k spare cores, k+1 comparators per core can approximately constitute the area cost.

The exemplary result of relaxing the "no yield loss" constraint can alleviate the area cost to be analyzed. In the presence of k spare cores, the utilization of k instead of k+1 comparators per core, for instance, can reduce the cost by one comparator per core, while introducing the possibility of yield loss. For a chip with exactly k bad cores, yield loss can occur when a good core can be compared against only these k bad cores, as the consistent mismatch information can fail to exonerate this good core. The exemplary probability of yield loss in this case can be, for example, as follows:

$$P_{YL} = (1-Y)^k \cdot Y^{N-k} \cdot \frac{N}{\binom{N}{k}}.$$

As this can be the only yield loss scenario with k spare cores; (1) with fewer than k defective cores, every good core can definitely be compared against another good core, and (2) with more than k defective cores, the chip may not be usable, and should fail the test anyways. In this equation, Y can denote the yield for one core, and N can denote the total number of identical cores on chip.

Relaxing the "no yield loss" constraint further by utilizing k−1 instead of k+1 comparators further alleviates the area cost by two comparators per core, but can increase the possibility of yield loss, for example, as follows:

$$P_{YL} = (1-Y)^k \cdot Y^{N-k} \cdot \frac{N \cdot (N-k)}{\binom{N}{k}},$$

which can occur only when k−1 of k defective cores can all be compared with a good core. Fewer or more than k cores may not result in a yield loss in this case either.

This exemplary analysis, which can be repeated for other cases where fewer comparators can be utilized per core, can indicate that a trade-off between area cost and yield loss exists, and that this trade-off can be explored judiciously.

Exemplary Pipelining, Isolation and Test Translation

The exemplary embodiment of the system, method and computer-accessible medium for TAM, according to the present disclosure, can facilitate certain implementation requirements. These exemplary requirements can be identical to those imposed on the prior art TAMs.

Proper routing of the input channels to cores in order to broadcast stimuli can use pipelining. As described previously (see, e.g., Reference 17), a pipelining mechanism can be provided, where the broadcast and comparison operations to/among cores can be staggered. Another technique (see, e.g., reference 19) proposes a simpler approach by using balancing registers. This exemplary approach can be utilized for proper pipelining of stimuli broadcast in the function. There can be certain implementation requirements for the exemplary TAM to function properly as well.

Core isolation, and IEEE 1500 compatibility, can be another preference for any modular test approach, including those for identical cores. This can be a mature area, and many core isolation mechanisms exist in the literature. (see, e.g., Reference 10). As shown in FIG. 3, the wrapper cells, which can be part of the bandwidth of scan chains 315, can be placed based on their physical position on the appropriate scan chain, can be inserted to control and observe core I/Os can be assumed to be stitched along with the other scan cells in the core, possibly into separate dedicated chains.

A proper core isolation coupled with a TAM that can deliver and collect test data from/to cores can enable a modular test approach, with the additional benefits of test re-use. In the case of identical cores, this benefit can be further pronounced, as there can be a single core design on which ATPG can be performed. The chip-level stimuli can be obtained through a simple post-processing of the core-level test patterns, which can involve padding of stimuli with dummy bits to account for the balancing registers used for pipelining. Response collection can be replaced by match/mismatch signature computation on chip, eliminating the need for any post-processing of the core responses.

Exemplary Reconfigurable TAM

The exemplary system, method and computer-accessible medium for TAM, with or without diagnostic, can differ in terms of bandwidth requirements. The former can utilize BW_in input channels, while the addition of diagnostic capabilities can utilize BW_in input and BW_out channels. If only a single version of the chip can be produced where diagnostics can be performed selectively either on only unusable chips or on a subset of good/usable chips, then a reconfigurable TAM design that can support both test and diagnostics can be used. Full utilization of bandwidth (e.g., tester channels) can utilize two modes of scan within each core. Low compression mode (e.g., where BW_in input channels can fan out to core scan chains), and high compression mode (e.g., where BW_in+BW_out input channels can fan out to a larger number of shorter chains). In the test mode, for example, the high compression mode can be used to test the entire chip in less time than testing a single core. In the diagnostic mode, the entire chip can be tested (e.g., with first failing core fully observed) in the same amount of time used to test a single core. Both modes can utilize the same number of tester channels (e.g., BW_in+BW_out), resulting in a uniform interface. However, BW_out of these channels can be connected to bidirectional chip pins, as they act as input channels in one mode, and as output channels in the other mode. A similar dual-mode approach is also known. (See, e.g., Reference 17).

Exemplary Comparisons and Results

Qualitative comparisons can be provided against the previously proposed TAMs for identical cores, as there may be no common set of benchmarks on which previous techniques have been applied. Table 1 above provides comparisons of the prior art TAM and the exemplary system, method and computer-accessible medium for TAM. Columns 2 through 4 can denote the number of input channels, output channels, and the test time, all for testing the entire chip. BW_in and BW_out can denote the input and output bandwidth requirement for a testing single core. T can denote the test time for a single core, and N can be the number of identical cores on a chip. Column 5 can provide the test time-bandwidth product, roughly indicating the cost incurred to test the entire chip. Column 6 can state whether the TAM approach can result in yield loss in the presence of spare cores. The first row in the table can be dedicated to the basic core-based testing approach, wherein one core can be tested at a time; this can be referred to as the base case.

The advantages and disadvantages of all exemplary TAMs can be provided in this table. The dedicated channel approach (see e.g., References 5, 6, 12 and 13) can deliver no cost savings compared to the base case. The comparison-based TAMs (see, e.g., References 14 and 15) can alleviate output bandwidth requirements, yet at the expense of possible yield loss. Approaches where the loaded response can be taken (see, e.g., References 3 and 17) and compared with core responses can be suboptimal in terms of bandwidth, and thus in terms of test cost, while another approach where an arbitrary core's response can be taken (see, e.g., References 17 and 18) can be suboptimal in terms of not only bandwidth requirements but also of the number of test sessions it can utilize. The exemplary system, method and computer-accessible medium for TAM, according to an exemplary embodiment of the present disclosure, can be reduced with reduced bandwidth requirements and test time, while ensuring no yield loss in the presence of spare cores.

Figure 5:
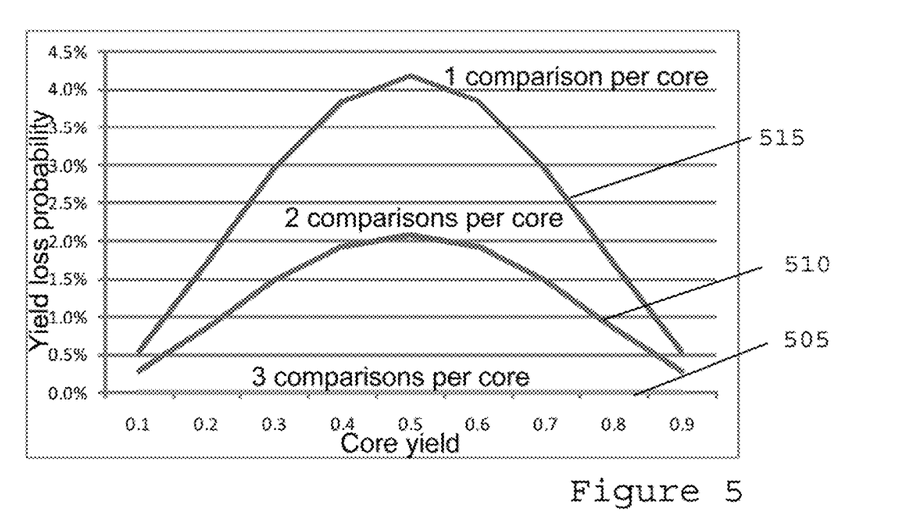
FIG. 5 is an exemplary graph of exemplary yield loss versus area trade-off for a 4-core chip with 2 spare cores, according to an exemplary embodiment of the present disclosure.

Yield loss impact of alleviating the area cost through reducing number of comparators per core is illustrated in the graph of FIG. 5, which shows, for an example, a 4-core chip with 2 spare cores. Three plots in this exemplary graph can denote (a) the exemplary system, method and computer-accessible medium for TAM with each core compared against three other cores (e.g., 0 yield-loss case) (505), (b) the exemplary system, method and computer-accessible medium for TAM with each core compared against two other cores (510), and (c) the exemplary system, method and computer-accessible medium for TAM with each core compared against a single other core (515). The third exemplary case 515, where the yield loss can be the largest, can correspond to the spare-unaware comparison-based TAMs. (See, e.g., References 14 and 15). Yield loss can be as large as 4% in these cases. The benefit of the exemplary system, method and computer-ac-

TABLE 1

Qualitative comparison of TAMs.

| Approach | Input BW | Output BW | Chip Test Time | Cost = Time · Bandwidth | Yield loss with spares? |
|---|---|---|---|---|---|
| Basic (one core at a tone) | $BW_{in}$ | $BW_{out}$ | $N \cdot T$ | $N \cdot T \cdot (BW_{in} + BW_{out})$ | No |
| Dedicated channels [12, 5, 13, 6] | $N \cdot BW_{in}$ | $N \cdot BW_{out}$ | T | $N \cdot T \cdot (BW_{in} + BW_{out})$ | No |
| Comparison-based [14] | $BW_{in}$ | 1 | T | $T \cdot (BW_{in} + 1)$ | Yes |
| Comparison-based [15] | $BW_{in}$ | — | T | $T \cdot BW_{in}$ | Yes |
| Ref. broked response [3] | $BW_{in} + BW_{out}$ | — | T | $T \cdot (BW_{in} + BW_{out})$ | No |
| Ref. bonded response [17] | $BW_{in} + BW_{out} + 4$ | — | T | $T \cdot (BW_{in} + BW_{out} + 4)$ | No |
| Ref. one cone's response [17, 18] | $BW_{in} + 4$ | $BW_{out}$ | $\alpha \cdot T$ | $\alpha \cdot T \cdot (BW_{in} + BW_{out} + 4)$ | No |
| Proposed | $BW_{in}$ | — | T | $T \cdot BW_{in}$ | No | cessible medium for TAM, according to an exemplary embodiment of the present disclosure, can be further pronounced when the yield can be between 30 and 70%.

Figure 6:
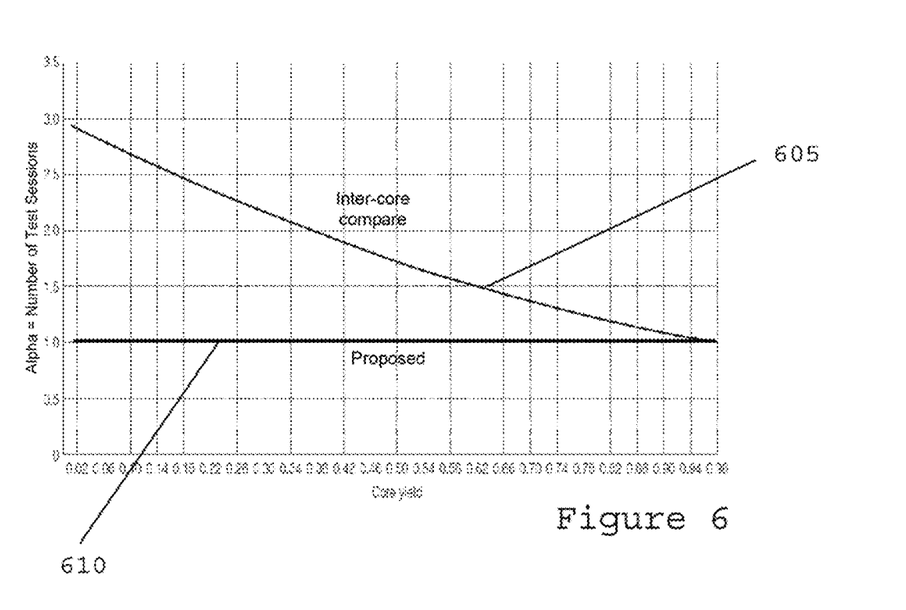
FIG. 6 is an exemplary graph of test time comparisons between the exemplary embodiment of the present disclosure and the prior art intercore compare procedures for a 4-core chip with 2 spare cores, according to an exemplary embodiment of the present disclosure.

The inter-core compare technique (see, e.g., References 17 and 18) can reduce and/or prevent yield loss by employing additional test sessions whenever the reference core turns out to be defective. In FIG. 6, the exemplary system, method and computer-accessible medium for TAM 610 can be compared against a previous procedure in 605 terms of the expected number of test sessions that can be utilized to prevent yield loss. (See, e.g., References 17 and 18). The exemplary system, method and computer-accessible medium for TAM, according to an exemplary embodiment of the present disclosure, can prevent a yield loss via a judicious on-chip comparison mechanism through a single test session that can be of the same duration to test a single core, while the inter-core approach 605 typically utilizes multiple sessions.

The exemplary system, method and computer-accessible medium for TAM, according to an exemplary embodiment of the present disclosure, can also be implemented with diagnostic support for a 16-core chip with a single spare core. VHDL design can be synthesized by using 0.18 micron TSMC® technology. Two versions can be (1) for BW_out=16 and (2) for BW_out=32. The gate count and area for the former case can be 5,475 and 220,576 square microns. For the latter exemplary case, gate count can be 11,329 and area can be 447,247 square microns. In order to provide a relative increase in area cost, an Advanced Encryption Standard ("AES") core (see, e.g., Reference 27) can also be implemented, which can result in an area of 3,065,898 square microns. The area overhead of the exemplary system, method and computer-accessible medium for TAM with diagnostic support can be about 0.45% and 0.91% relative to a chip with 16 identical AES cores of 16- and 32-chains each, respectively.

Ever increasing defect rates and test costs can be the exemplary basis for the utilization of spare cores in an effort to deliver reasonable yield levels and/or lower test costs. The exemplary system, method and computer-accessible medium for TAM, according to an exemplary embodiment of the present disclosure, can exploit the identicalness of cores; yet at the same time can cope with the challenges induced by testing a chip with spare cores. The exemplary system, method and computer-accessible medium for TAM can enable the test of a chip through reduced bandwidth requirements (e.g., BW_in) and reduced test time (e.g., same amount to test a single core), while preventing any yield loss, as it can be designed by accounting for the number of spare cores on a chip. The exemplary system, method and computer-accessible medium for TAM, according to an exemplary embodiment of the present disclosure, can facilitate the identification of all the good cores in usable chips, supporting models where chips can be priced based on number of good cores. The exemplary system, method and computer-accessible medium for TAM, according to an exemplary embodiment of the present disclosure, can also include diagnostic features, ensuring the observation of only bad cores, and thus minimizing diagnostic time as well.

Figure 7:
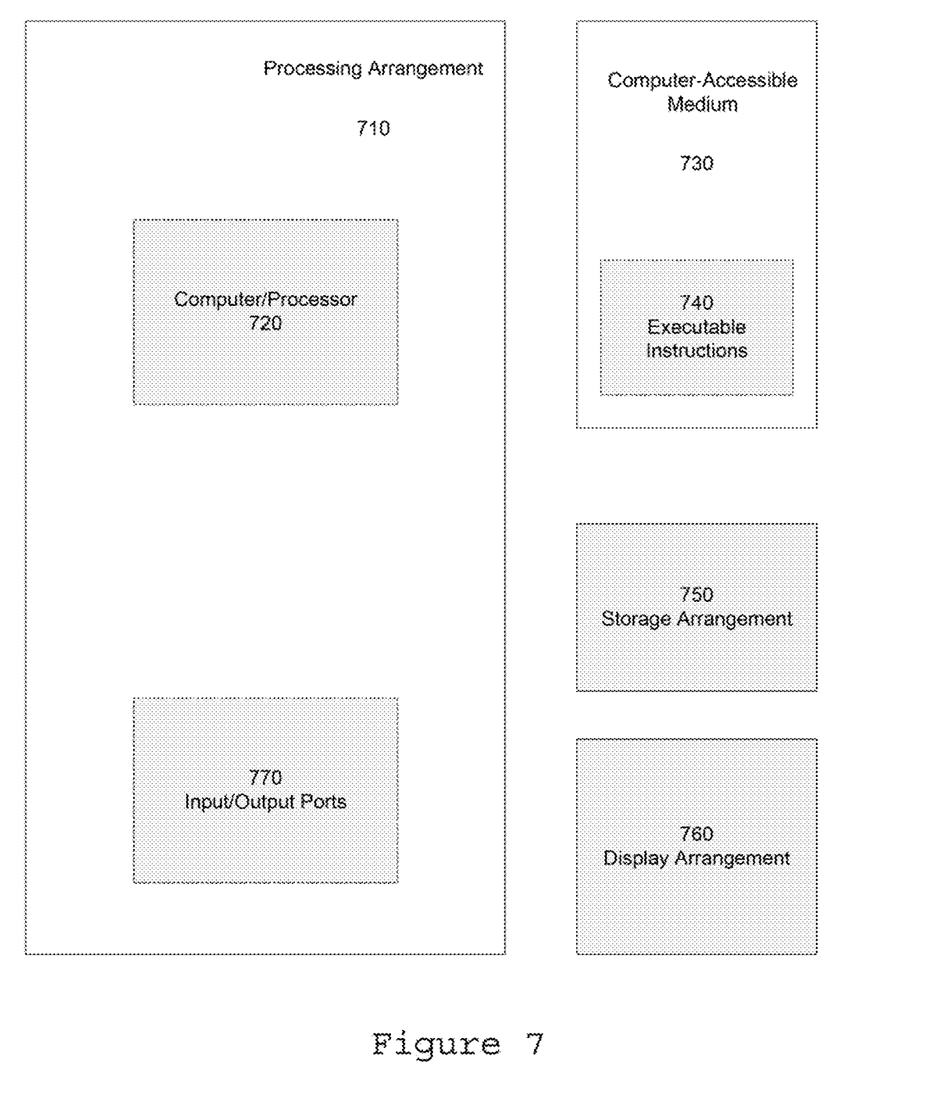
FIG. 7 is an illustration of an exemplary block diagram of an exemplary system in accordance with certain exemplary embodiments of the present disclosure.

FIG. 7 shows an exemplary block diagram of an exemplary embodiment of a system according to the present disclosure. For example, exemplary procedures in accordance with the present disclosure described herein can be performed by a processing arrangement and/or a computing arrangement 702. Such processing/computing arrangement 702 can be, for example, entirely or a part of, or include, but not limited to, a computer/processor 704 that can include, for example, one or more microprocessors, and use instructions stored on a computer-accessible medium (e.g., RAM, ROM, hard drive, or other storage device).

As shown in FIG. 7, for example, a computer-accessible medium 706 (e.g., as described herein above, a storage device such as a hard disk, floppy disk, memory stick, CD-ROM, RAM, ROM, etc., or a collection thereof) can be provided (e.g., in communication with the processing arrangement 702). The computer-accessible medium 706 can contain executable instructions 708 thereon. In addition or alternatively, a storage arrangement 710 can be provided separately from the computer-accessible medium 706, which can provide the instructions to the processing arrangement 702 to configure the processing arrangement to execute certain exemplary procedures, processes and methods, as described herein above, for example.

Further, the exemplary processing arrangement 702 can be provided with or include an input/output arrangement 714, which can include, for example, a wired network, a wireless network, the internet, an intranet, a data collection probe, a sensor, etc. As shown in FIG. 7, the exemplary processing arrangement 702 can be in communication with an exemplary display arrangement 712, which, according to certain exemplary embodiments of the present disclosure, can be a touch-screen configured for inputting information to the processing arrangement in addition to outputting information from the processing arrangement, for example. Further, the exemplary display 712 and/or a storage arrangement 710 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. It should be understood that the exemplary procedures described herein can be stored on any computer-accessible medium, including a hard drive, RAM, ROM, removable disks, CD-ROM, memory sticks, etc., and executed by a processing arrangement and/or computing arrangement which can be and/or include a hardware processors, microprocessor, mini, macro, mainframe, etc., including a plurality and/or combination thereof. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.

[1] D. Geer, "Chip makers turn to multicore processors," *Computer*, vol. 38, no. 5, pp. 11-13, May 2005.

[2] L. Bushard, N. Chelstrom, S. Ferguson, and B. Keller, "Dft of the cell processor and its impact on eda test software," in *ATS*, 2006, pp. 369-374.

[3] S. Makar, T. Altinis, N. Patkar, and J. Wu, "Testing of vega2, a chip multi-processor with spare processors," in *ITC*, 2007, pp. 1-10.

[4] Lei Zhang, Yinhe Han, Qiang Xu, and Xiaowei Li, "Defect tolerance in homogeneous manycore processors using core-level redundancy with unified topology," in *DATE*, 2008, pp. 891-896.

[5] P. J. Tan, Tung Le, Keng-Hian Ng, Prasad Mantri, and James Westfall, "Testing of ultrasparc t1 microprocessor and its challenges," in *ITC*, 2006, pp. 1-10.

[6] D. Iverson, D. Dickinson, J. Masson, C. Newman-LaBounty, D. Simmons, and W. Tanona, "Redundant core testing on the cell be microprocessor," in *ITC*, 2010, pp. 1-6.

[7] S. Shamshiri, P. Lisherness, Sung-Jui Pan, and Kwang-Ting Cheng, "A cost analysis framework for multi-core systems with spares," in *ITC*, 2008, pp. 1-8.

[8] Lin Huang and Qiang Xu, "Economic analysis of testing homogeneous many core chips," *TCAD*, vol. 29, no. 8, pp. 1257-1270, 2010.

[9] T. Wood, "Position statement: Have we overcome the challenges associated with soc and multi-core testing?," in *ITC*, 2005, p. Panel 6.3.

[10] "IEEE standard testability method for embedded core-based integrated circuits," *IEEE Std* 1500-2005, 2005.

[11] E. J. Marinissen and Y. Zorian, "IEEE std 1500 enables modular soc testing," *IEEE D&T*, vol. 26, no. 1, pp. 8-17, 2009.

[12] M. Riley, L. Bushard, N. Chelstrom, N. Kiryu, and S. Ferguson, "Testability features of the first-generation cell processor," in *ITC*, 2005, pp. 9 pp.-119.

[13] R. Molyneaux, T. Ziaja, Hong Kim, S. Aryani, Sungbae Hwang, and A. Hsieh, "Design for testability features of the sun microsystems niagara2 cmp/cmt sparc chip," in *ITC*, 2007, pp. 1-8.

[14] I. Parulkar, T. Ziaja, R. Pendurkar, A. D'Souza, and A. Majumdar, "A scalable, low cost design-for-test architecture for ultrasparc trade; chip multi-processors," in *ITC*, 2002.

[15] Yuejian Wu and P. MacDonald, "Testing asics with multiple identical cores," *TCAD*, vol. 22, no. 3, pp. 327-336, March 2003.

[16] A. D. Singh, "Scan based testing of dual/multi core processors for small delay defects," in *ITC*, 2008, pp. 1-8.

[17] G. Giles, J. Wang, A. Sehgal, K. J. Balakrishnan, and J. Wingfield, "Test access mechanism for multiple identical cores," in *ITC*, 2009, pp. 1-10.

[18] K. J. Balakrishnan, G. Giles, and J. Wingfield, "Test access mechanism in the quad-core amd opteron microprocessor," *IEEE D&T*, vol. 26, no. 1, pp. 52-59, 2009.

[19] Zichu Qi, Hui Liu, Xiangku Li, Da Wang, Yinhe Han, Huawei Li, and Weiwu Hu, "A scalable scan architecture for godson-3 multicore microprocessor," in *ATS*, 2009, pp. 219-224.

[20] Chun-Chuan Chi, Cheng-Wen Wu, and Jin-Fu Li, "A low-cost and scalable test architecture for multi-core chips," in *ETS*, May 2010, pp. 30-35.

[21] M. Majeed, D. Ahlstrom, U. Ingelsson, G. Carlsson, and E. Larsson, "Efficient embedding of deterministic test data," in *ATS*, 2010, pp. 159-162.

[22] Yanjing Li, S. Makar, and S. Mitra, "Casp: Concurrent autonomous chip self-test using stored test patterns," in *DATE*, 2008, pp. 885-890.

[23] M. Sharma, A. Dutta, W.-T. Cheng, B. Benware, and M. Kassab, "A novel test access mechanism for failure diagnosis of multiple isolated identical cores," in *ITC*, 2011, pp. 1-8.

[24] D. K. Pradhan and J. A. Abraham, *Fault-tolerant computing: theory and techniques*, Fault-tolerant Computing: Theory and Techniques. Prentice-Hall, 1986.

[25] P. Girard, "Survey of low-power testing of VLSI circuits," *IEEE Design and Test*, vol. 19, no. 3, pp. 82-92, 2002.

[26] O. Sinanoglu and A. Orailoglu, "Test power reductions through computationally efficient, decoupled scan chain modifications," *Reliability, IEEE Transactions on*, vol. 54, no. 2, pp. 215-223, June 2005.

[27] "http://www.isaakian.com/vhdl/aes/,".

What is claimed is:

1. A non-transitory computer-accessible medium including instructions thereon for testing a multi-core chip having a plurality of identical cores, and that are accessible by a hardware processing arrangement, wherein, when the processing arrangement executes the instructions, the processing arrangement is configured to perform at least one procedure comprising:
comparing each of the cores from the multi-core chip to one another using a first number of on-chip comparators which corresponds to a second number of spare cores plus 1.

2. The computer-accessible medium of claim 1, wherein the processing arrangement is further configured to indicate that at least one of the cores is defective when there is a mismatch between at least two of the cores.

3. The computer-accessible medium of claim 1, wherein the processing arrangement is further configured to identify at least two of the cores as not defective when there is a perfect match between the at least two of the cores.

4. The computer-accessible medium of claim 1, wherein the processing arrangement is further configured to fail the multi-core chip if a third number of defective ones of the cores is greater than the second number of the spare cores.

5. The computer-accessible medium of claim 1, wherein the processing arrangement is further configured to use one on-chip comparator to compare test responses of a pair of cores of the plurality of cores, cycle-by-cycle, wherein every core that is included in a third number of pairwise core comparisons corresponds to the second number of spare cores on the multi-core chip plus 1.

6. The computer-accessible medium of claim 5, wherein a fourth number of on-chip comparators of the multi-core chip is equal to a total number of the cores multiplied by one-half the second number of the spare cores plus 1.

7. The computer-accessible medium of claim 1, wherein the processing arrangement is further configured to record the comparison of each of the cores using sticky mismatch bits.

8. The computer-accessible medium of claim 7, wherein the processing arrangement is further configured to set a signature bit at 0 when at least one of the cores fails the comparison.

9. The computer-accessible medium of claim 1, wherein the processing arrangement is further configured to compare the multi-core chip using a diagnostic support.

10. The computer-accessible medium of claim 9, wherein the processing arrangement is further configured to lock an output channel of a first one of the cores to fail the comparison.

11. A method for testing a multi-core chip having a plurality of identical cores, comprising:
   receiving information related to the identical cores; and
   using a computer hardware arrangement, comparing each of the cores from the multi-core chip to one another using a first number of on-chip comparators which corresponds to a second number of spare cores plus 1.

12. The method of claim 11, further comprising indicating that at least one of the cores is defective when there is a mismatch between at least two of the cores.

13. The method of claim 11, further comprising identifying at least two of the cores as not defective when there is a perfect match between the at least two of the cores.

14. The method of claim 11, further comprising failing the multi-core chip if a third number of defective ones of the cores is greater than the second number of the spare cores.

15. The method of claim 11, further comprising comparing use one on-chip comparator to test responses of a pair of the cores, cycle-by-cycle, wherein every core that is included in a third number of pairwise core comparisons corresponds to the second number of spare cores on the multi-core chip plus 1.

16. The method of claim 15, wherein a fourth number of on-chip comparators of the multi-core chip is equal to a total number of the cores multiplied by one-half the second number of the spare cores plus 1.

17. The method of claim 11, further comprising recording the comparison of each of the cores using sticky mismatch bits.

18. The method of claim 17, further comprising setting a signature bit at 0 when at least one of the cores fails the comparison.

19. The method of claim 11, further comprising comparing the multi-core chip using a diagnostic support.

20. The method of claim 19, wherein the diagnostic support locks an output channel of a first one of the cores to fail the comparison.

21. A system for testing a multi-core chip having a plurality of identical cores, comprising:
   a computer arrangement which is configured to compare each of the cores from the multi-core chip to one another using a first number of on-chip comparators which corresponds to a second number of spare cores plus 1.

22. The system of claim 21, wherein the computer arrangement is further configured to indicate that at least one of the cores is defective when there is a mismatch between at least two of the cores.

23. The system of claim 21, wherein the computer arrangement is further configured to identify at least two of the cores as not defective when there is a perfect match between the at least two of the cores.

24. The system of claim 21, wherein the computer arrangement is further configured to fail the multi-core chip if a third number of defective ones of the cores is greater than the second number of the spare cores.

25. The system of claim 21, wherein the computer arrangement is further configured to use one on-chip comparator to compare test responses of a pair of the cores, cycle-by-cycle, wherein every one of the core that is included in a third number of pairwise core comparisons corresponds to the second number of spare cores on the multi-core chip plus 1.

* * * * *